United States Patent [19]

Peterson, Jr.

[11] Patent Number: 4,651,018
[45] Date of Patent: Mar. 17, 1987

[54] NEUTRAL START CIRCUIT FOR A VEHICLE INCLUDING A POWER TAKE-OFF ASSEMBLY

[75] Inventor: Rudolph A. Peterson, Jr., Horicon, Wis.

[73] Assignee: Deere & Company, Moline, Ill.

[21] Appl. No.: 764,684

[22] Filed: Aug. 12, 1985

[51] Int. Cl.$^4$ ............................................... B60L 1/00
[52] U.S. Cl. .................................. 307/10 SB; 307/9; 307/10 R; 180/273
[58] Field of Search .................. 307/9, 10 R, 10 SB, 307/119, 132 R, 139, 141; 74/7 C, 11; 290/18, 21, 41, DIG. 1, DIG. 6; 318/485, 487, 549; 180/271, 273, 279, 82 R, 82 A

[56] References Cited

U.S. PATENT DOCUMENTS

| | | | |
|---|---|---|---|
| 3,906,441 | 9/1975 | Andersen et al. | 307/10 SB X |
| 4,010,379 | 3/1977 | Shimamoto | 307/9 |
| 4,051,915 | 10/1977 | Behrens | 307/10 R X |
| 4,142,601 | 3/1979 | Ochiai | 307/10 R X |
| 4,317,500 | 3/1982 | Bening | 180/273 |
| 4,509,614 | 4/1985 | Bando et al. | 180/273 |

Primary Examiner—William M. Shoop, Jr.
Assistant Examiner—Sharon D. Logan

[57] ABSTRACT

A tractor includes a PTO clutch and is provided with a safety interlock circuit including an ignition switch having separate output terminals respectively coupled to PTO and transmission switches that must be closed, by disengaging the clutch and shifting the transmission to neutral, before the tractor can be started. A start relay is coupled for being energized only when the PTO switch is closed and it then acts to complete a current path between the transmission switch and a starter solenoid. When de-energized, the start relay acts to complete an alternate current path to the solenoid, this path containing a lamp for indicating clutch engagement and which acts to drop the voltage below that required for starting. Mechanical engagement of the PTO clutch is electrically maintained by a PTO coil coupled in parallel with the start relay and with a reset relay, the latter operating when energized to complete an alternate current path for maintaining the PTO coil energized, after the clutch is engaged and the PTO switch opens, for so long as an operator remains seated to close a normally open seat switch which functions to control a transistor that controls grounding of the reset relay.

1 Claim, 2 Drawing Figures

NEUTRAL START CIRCUIT FOR A VEHICLE INCLUDING A POWER TAKE-OFF ASSEMBLY

BACKGROUND OF THE INVENTION

This invention relates to vehicles such as utility or lawn and garden tractors which include a power take-off (PTO) assembly.

It is known to provide such vehicles as utility tractors, and lawn and garden tractors with a PTO assembly for delivering power to a vehicle attachment. In the interest of operator safety, it is also known to provide the PTO assembly with disengaging means for automatically disengaging the PTO assembly should the operator leave the vehicle seat. The disengaging means requires repositioning of the operator on the seat and PTO control reset before the PTO assembly can be re-activated. Such disengaging means should be both cost efficient and reliable.

SUMMARY OF THE INVENTION

It is an objective of the present invention to present an electrical circuit which interacts with a conventional PTO assembly, which electrical circuit is reliable and exhibits improved cost efficiency.

The electrical circuit interacts with a conventional PTO assembly which is mechanically actuated to an engaged position and which includes an electrically responsive coil to consumate and maintain engagement of the PTO assembly. The PTO assembly includes a conventional mechanical actuation linkage which opens a PTO switch constituent to the electrical circuit when the linkage is in the engaged position, conversely, the PTO switch is closed when the linkage is in the disengaged position.

The electrical circuit includes a normally open (ON) PTO switch in receiving communication with a first output of a double throw ignition switch. The output of the PTO switch is in communication with a first input of a conventional reset module and with an actuation input of a two-position relay. A second input of the reset module communicates with the first ignition switch output and a third input of the reset module communicates with the first output of the ignition switch through a normally open seat switch. The output of the reset module communicates with the PTO coil constituent to the PTO assembly.

The second output of the ignition switch communicates with a transmission normally open switch which is closed only when the transmission is in neutral. The output of the transmission switch communicates with a first relay input. The second relay input is in communication with the first ignition switch output through a PTO lamp. The output of the relay is directed to the starter solenoid of the carrying tractor.

The electrical circuit operates in a manner that should the ignition switch be placed in the "START" position with the PTO switch closed, electrical potential is supplied to the relay placing the relay "ON" to allow electrical potential to traverse the second relay input to the relay output from the first ignition switch output and on to the starter solenoid. However, the presence of the PTO lamp produces a voltage drop thereacross which reduces the voltage available to the starter solenoid to such a level that the starter solenoid is unable to be activated. The PTO switch must therefore be "OPEN" resulting in the relay being "OFF" and the transmission switch being "CLOSED" to permit electrical potential having sufficient voltage to traverse the relay to the starter solenoid.

In either the "START" or "RUN" with the PTO switch closed, the inputs to the reset module are receiving electrical potential, thereby, activating the PTO coil, however, the PTO clutch is not in engaging position until the linkage is so repositioned. Once the PTO clutch is placed in engaging position by the linkage, the PTO coil maintains the engagement. Should the seat switch thereafter be opened occasioned by dismounting of the operator from the seat, subject to a short time delay, electrical potential to the PTO coil is disrupted by the reset module causing the PTO assembly to disengage. In order to reengage the PTO assembly, the PTO actuation linkage must be reset.

DESCRIPTION OF THE PREFERRED EMBODIMENT

Figure 1:
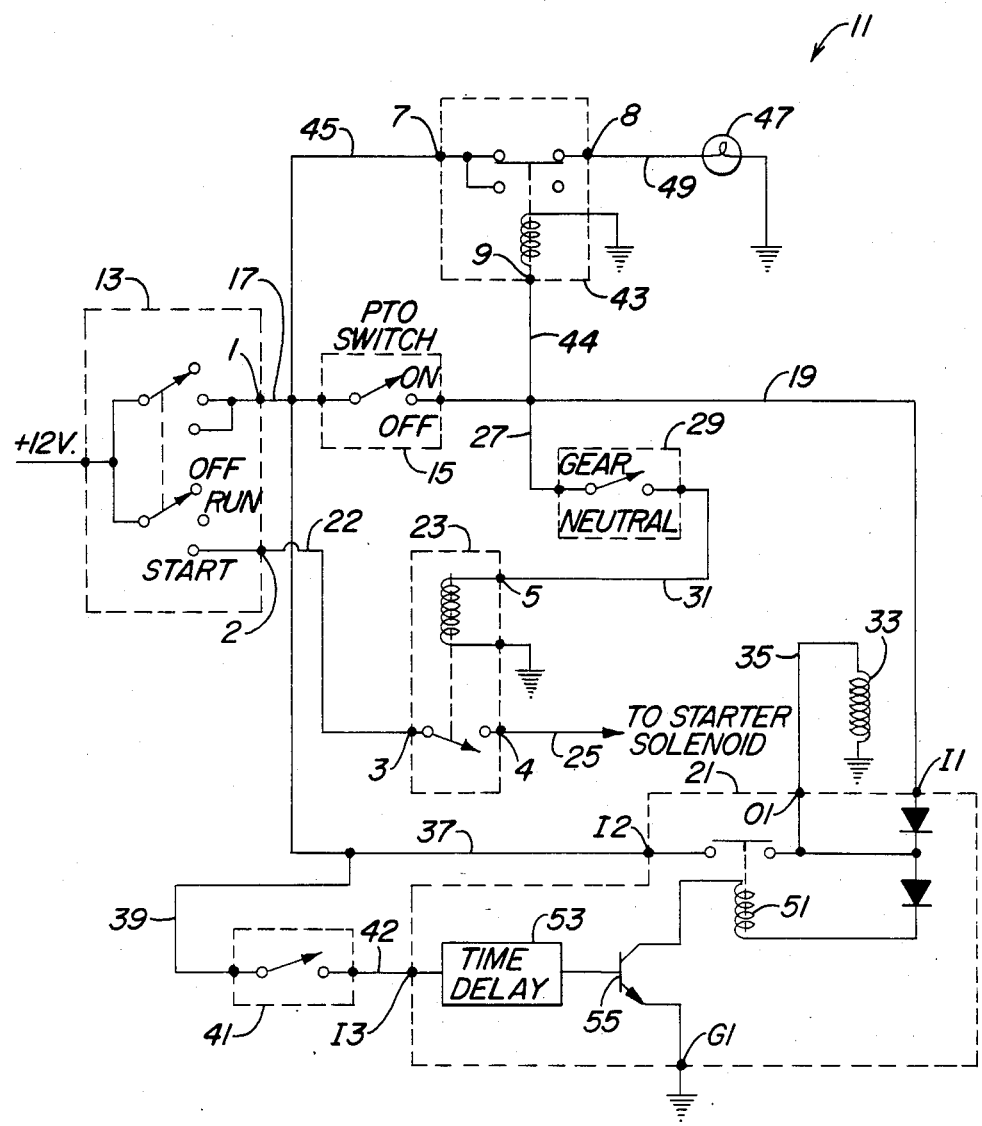
FIG. 1 is a schematic of a prior art electrical circuit.

Referring to FIG. 1, a prior art electrical circuit, generally indicated as 11 includes a double throw ignition switch 13 having "OFF", "RUN" and "START" positions. A first output 1 of the switch 13 is in communication with a two position normally open PTO switch 15 through a line 17. A line 19 communicates the PTO switch 15 with one of the inputs I1 of a conventional PTO time delay and reset module 21.

A second output 2 of switch 13 is in communication with an input 3 of a neutral start relay 23 through a line 22. An output 4 of relay 23 is delivered to the starter solenoid of the carrying vehicle (not shown) through a line 25. A line 27 intersects line 19 and is received at an input of a transmission switch 29, which switch 29 communicates with the transmission or transmission control linkage (not shown) in a conventional manner to be closed only when the vehicle's transmission is in neutral. The output of the transmission switch 29 is in communication with an actuation input 5 of the relay 23 through a line 31.

The reset module 21 further includes an output O1, inputs I2 and I3, and a ground terminal G1. A PTO clutch coil 33 associated with a conventional PTO clutch is in communication with output O1 of the module 21 through a line 35. A line 37 intersects line 17 to communicate with input I2 of module 21. A line 39 intersects line 37 to communicate with an input of a normally open seat switch 41. The output of seat switch 41 is in communication with the input I3 of module 21 via line 42.

The electrical circuit 11 further includes a second relay 43 which is normally closed. A line 45 intersects line 17 to communicate with the input 7 of relay 43. The output 8 of relay 43 is in communication with a PTO light 47 through a line 49. A line 44 intersecting to line 19 is connected to an actuation terminal 9 of relay 43.

In operation, the prior art electrical circuit 11 is activated by placing the switch 13 in the "START" position. At this point, should the PTO switch be in the "ON" position and/or the transmission switch 29 be open indicating the vehicle's transmission is in gear, electrical potential is not able to traverse line 17, and/or 27 and 31 to activate neutral start relay 23. Therefore, electrical potential is not able to traverse relay 23 from line 22 to line 25 to activate the starter solenoid. Therefore, it is required that both PTO switch 15 and transmission switch 29 be closed in order to close relay 23 in order to permit the vehicle's starter solenoid to receive electrial potential.

It is noted that when switch 13 is in the "START" position and the PTO switch 15 is in the "OFF" position, that module 21 is receiving electrical potential at all inputs I1, I2 and I3, via respectively, lines 17 and 19, lines 17 and 37, and lines 17, 37,39 and 42, seat switch 41 being closed by positioning of the operator on the vehicle seat. The actuation module 21 causes the output O1 to forward electrical potential to PTO coil 33 via line 35 and also to close module relay 51. However, the associated PTO clutch is not in engagement because the requisite mechanical motion through a conventionl linkage system has not been carried out. Should the linkage system be in a position to open PTO switch 15 prior to positioning the switch 13 to the "START" position the tractor's starter solenoid cannot receive electrical potential as aforedescribed.

Placing the switch 13 in the "RUN" position subsequent to vehicle start and activating the PTO switch 15 to the "ON" position, now brings the PTO clutch into engagement to allow the previously electrically activated PTO coil 33 to maintain engagement in a proper manner. Electrical potential previously delivered to relay 43 is thereby disrupted causing relay 43 to close allowing PTO light 47 to be energized via lines 17, 45 and 49. Should the operator thereafter leave the vehicle seat for a time in excess of that specified by a conventional time delay, module transistor 55 is turned "OFF" causing the module relay 51 to open and, thereby, placing PTO coil 33 in a de-energized state allowing the PTO clutch to self release. The PTO coil 33 cannot be reenergized until the PTO lever is reset, i.e., switching the PTO switch to the "OFF" position and then back to the "ON" position.

Figure 2:
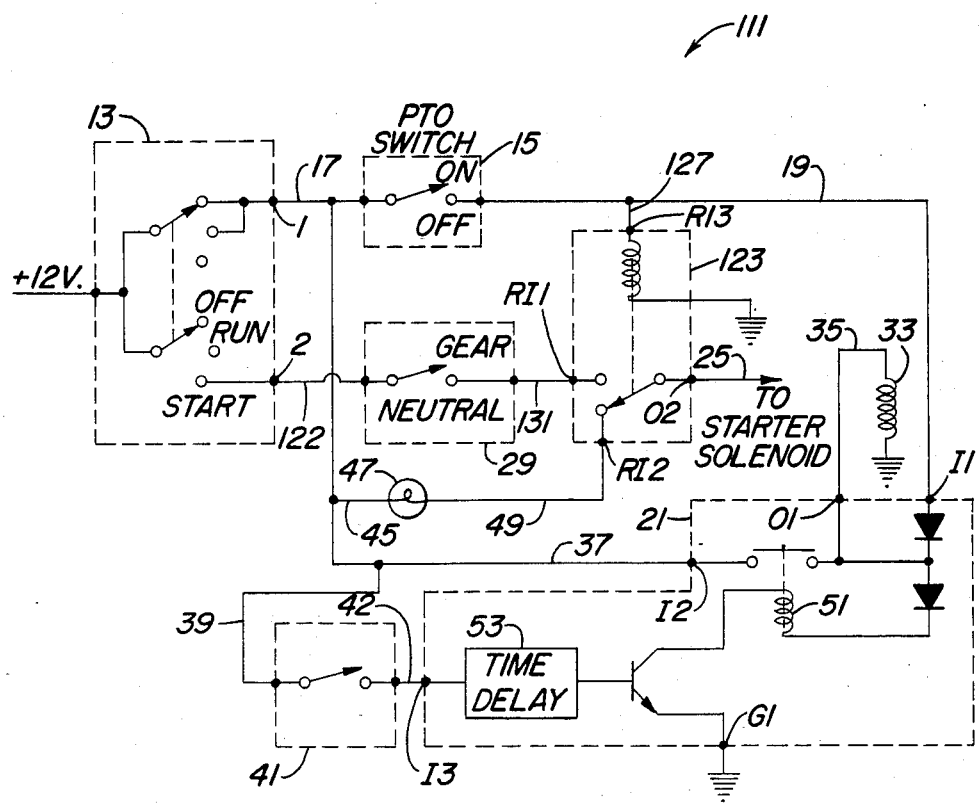
FIG. 2 is a schematic of an electrical circuit constructed in accordance with the present invention.

Referring now to FIG. 2, the improved circuit 111 is intended to function identically to circuit 11 with a reduction in the number of relays. Like components between circuit 11 and circuit 111 have the same numeral reference for the purpose of clarity.

Circuit 111 is comprised of a double throw switch 13 with outputs 1 and 2. Output 1 of switch 13 communicates with PTO switch 15 and input I1 of PTO reset module 21 via, respectively, lines 17 and 19. Module 21 input I2 is in communication with line 17 via line 37. Module 21 input I3 communicates with line 37 via, respectively, line 39, seat switch 41 and line 42. Output 2 of the ignition switch 13 communicates with the input of transmission switch 29 via line 122. The output of switch 29 communicates with the first input RI1 of a relay 123 via line 131. Line 45 communicates with line 17 via line 37. Line 45 thereby can deliver electrical potential to PTO lamp 47. PTO lamp 47 is in communication with a second input RI2 of relay 123 via line 49. The relay 123 has a third input RI3 which when energized activates the relay 123. Relay input RI3 is in communication with line 19 via line 127.

The function performed by circuit 111 is the same as that performed by prior art circuit 11. However, circuit 111 achieves the function with one less relay. In operation, when switch 13 is placed in its "START" position and the PTO switch 15 is placed in the "OFF" position in the aforedescribed manner and, in addition, the transmission switch is in its neutral or "CLOSED" position, the relay 123 is energized to allow the electrical potential to traverse relay 123 between relay input RI1 and a relay output O2 and, thereafter, be delivered to the vehicle's starter solenoid via line 25. Further electrical potential is delivered to reset module inputs I1, I2 and I3 in the manner aforedescribed to allow PTO reset coil 33 to be energized. However, should the switch 13 be in the "START" position and the PTO switch 15 be in the "ON" position, i.e., PTO switch 15 is open, electrical potential cannot traverse PTO switch 15 to energize relay 123. In the de-energized state relay 123 does provide traversing communication between a relay input RI2 and the relay output O2, however, electrical potential delivered to relay input RI2 via lines 17, 45 and 49 must first traverse PTO lamp 47. The voltage drop of the electrical potential across PTO lamp 47 is sufficient to prevent actuation of the vehicle's starter solenoid, i.e., the starter receives insufficient voltage to start the vehicle engine. Should the transmission switch 29 be open and the PTO switch be closed or "OFF", electrical potential cannot traverse switch 29 and, therefore, there is no potential delivered to the starter, solenoid via line 131, relay 123 and line 25 to cause the vehicle to start.

Subsequent placement of switch 13 in the "RUN" position and the PTO switch 15 in the "ON" position turns relay 123 "OFF" allowing traversing communication between relay 123 input RI2 and output O2. Again, however, the voltage across the PTO lamp 47 will be insufficient to cause activation of the starter solenoid.

The circuit 111 operates through the PTO switch 18, line 19 and 37 identically to circuit 11 to disengage the PTO clutch by deenergizing the PTO coil 33 to require reset before re-engaging the PTO clutch and re-energizing the PTO coil 33 as aforedescribed.

I claim:

1. A starting circuit, adapted for use in a tractor having a transmission shiftable among Neutral and various GEAR conditions and a power take-off including a mechanically engaged, electrically held clutch, the circuit comprising: an ignition switch having separate first and second outputs and a switching element movable among an OFF position, a START position for energizing both outputs and a RUN postion for energizing only the first output; a start relay including a grounded start coil, a first relay input, a second relay input, a relay output and a relay switch element normally connecting the second relay input to the relay output and being responsive to energization of the relay coil for connecting the first relay input to the relay output; a power take-off switch connected between the first ignition switch output and the start coil and adapted for being closed only when the power take-off clutch is disengaged; a transmission switch connected between the second ignition switch output and the first start relay input and adapted to be closed only when the tractor transmission is in its Neutral condition; said output of the start relay being adapted for connection to a starter solenoid; and a power take-off engagement indicator lamp coupled directly to the first output of the ignition switch and the second input of the start relay and effecting, when lit, a drop in voltage sufficient to prevent energization of a starter embodying the starter solenoid adapted for connection to the start relay output whereby the start relay is operable to ensure that the relay output will receive sufficient voltage for effecting starting only if the power take-off and transmission switches are both closed while at the same time establishing a current path for energizing the lamp at all times when the power take-off switch is open.

* * * * *